United States Patent [19]

Marazzi

[11] 4,384,848
[45] May 24, 1983

[54] PROCESS AND APPARATUS FOR FIRING CERAMIC MATERIALS

[75] Inventor: Filippo Marazzi, Sassuolo, Italy

[73] Assignee: Marazzi Ceramiche S.p.A., Sassuolo, Italy

[21] Appl. No.: 283,299

[22] Filed: Jul. 14, 1981

Related U.S. Application Data

[63] Continuation-in-part of Ser. No. 49,166, Jun. 18, 1979, abandoned.

[30] Foreign Application Priority Data

Jun. 21, 1978 [IT] Italy .................................. 24805 A/78

[51] Int. Cl.³ .................... F27D 3/00; F27D 13/00; F27B 3/22
[52] U.S. Cl. ....................................... 432/11; 432/12; 432/18; 432/19; 432/26
[58] Field of Search .................. 432/8, 11, 12, 18, 19, 432/24, 25, 26, 57, 144, 145, 146, 147, 150

[56] References Cited

U.S. PATENT DOCUMENTS

| | | | |
|---|---|---|---|
| 2,529,690 | 11/1950 | Hess | 432/147 |
| 2,795,054 | 6/1957 | Bowen | 432/8 |
| 3,108,351 | 10/1963 | Hermans | 432/133 |
| 3,227,782 | 1/1966 | Gie et al. | 432/11 |
| 3,291,465 | 12/1966 | Wilde | 432/146 |
| 3,604,695 | 9/1971 | Steeper | 432/11 |
| 3,969,069 | 7/1976 | Knaak | 432/9 |
| 4,005,979 | 2/1977 | Brock | 432/144 |
| 4,009,993 | 3/1977 | Marazzi | 432/122 |
| 4,183,885 | 1/1980 | Marazzi | 264/58 |

FOREIGN PATENT DOCUMENTS 868383 12/1941 France .................................. 432/24

Primary Examiner—John J. Camby
Attorney, Agent, or Firm—Toren, McGeady and Stanger

[57] ABSTRACT

A process for firing ceramic bodies, in particular tiles, is disclosed, consisting in conveying the ceramic bodies through an elongated heat treatment chamber, both main faces thereof being freely exposed to heat transmission, simultaneously heating said bodies and the chamber walls by means of a heating fluid, generally combustion gases, the temperature of the portions of the chamber walls which are in view of the ceramic bodies not being higher than that of the heating fluid and controlling the flow of the heating fluid so that its actual volume flow rate, measured axially of the chamber and at the point thereof where the chamber temperature is 900° C., is comprised between 4500 and 12,000, and preferably between 6000 and 10,000 cu.m. per sq.m. of transverse cross-section. Preferably the surface rate of travel of the tiles, when tiles are fired, is comprised between 22 and 30 sq.m. of tile per hour and per linear meter of inner perimeter of the chamber, for 4.5 mm. thick tiles, and between 16 and 22 sq.m. per hour and per meter for 10 mm. thick tiles.

11 Claims, 10 Drawing Figures

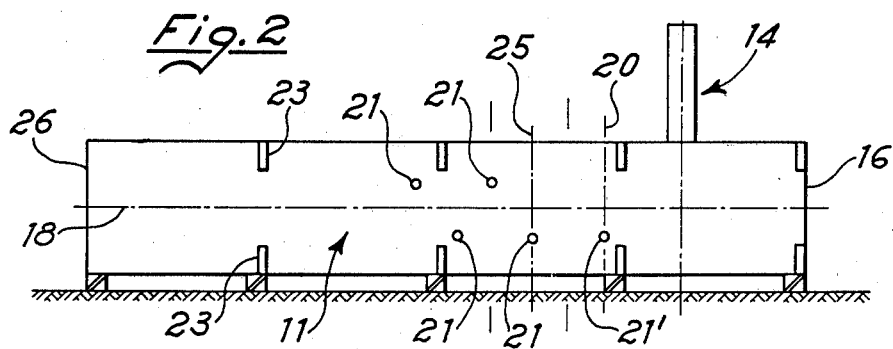
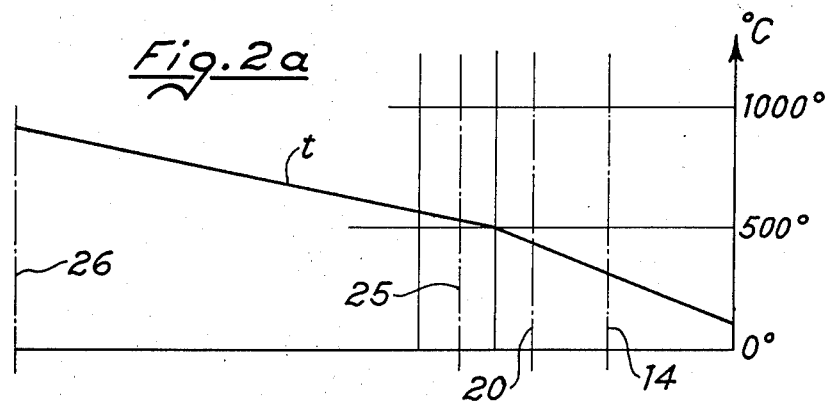
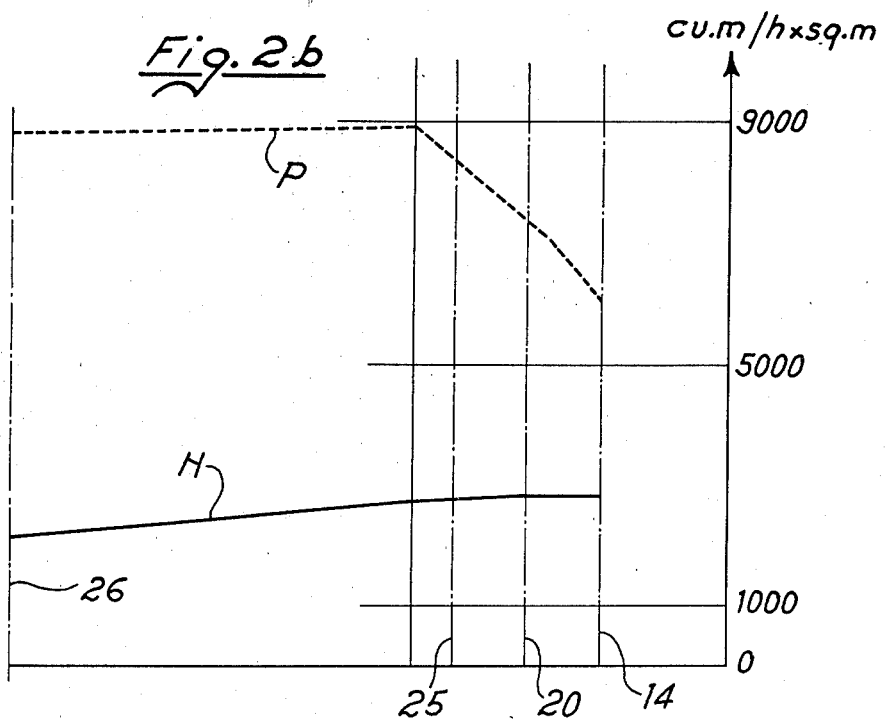

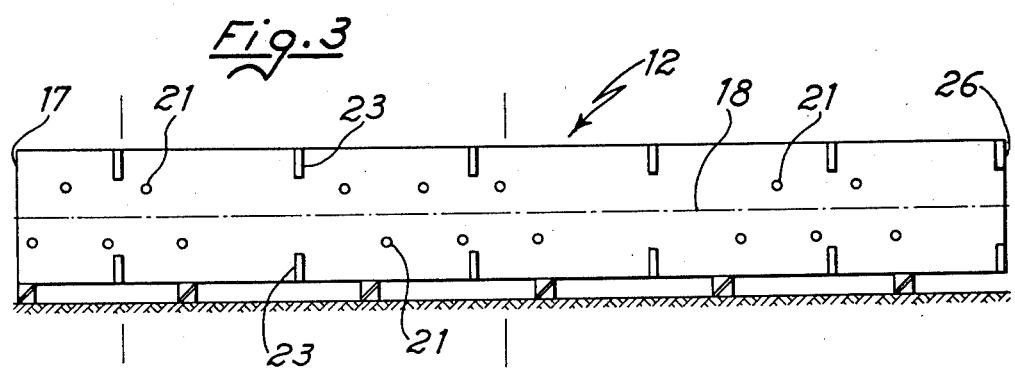
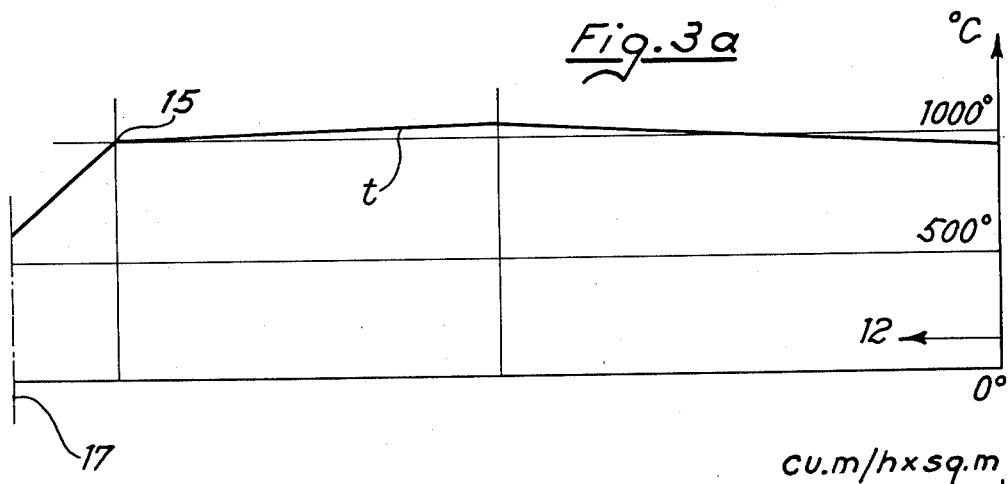
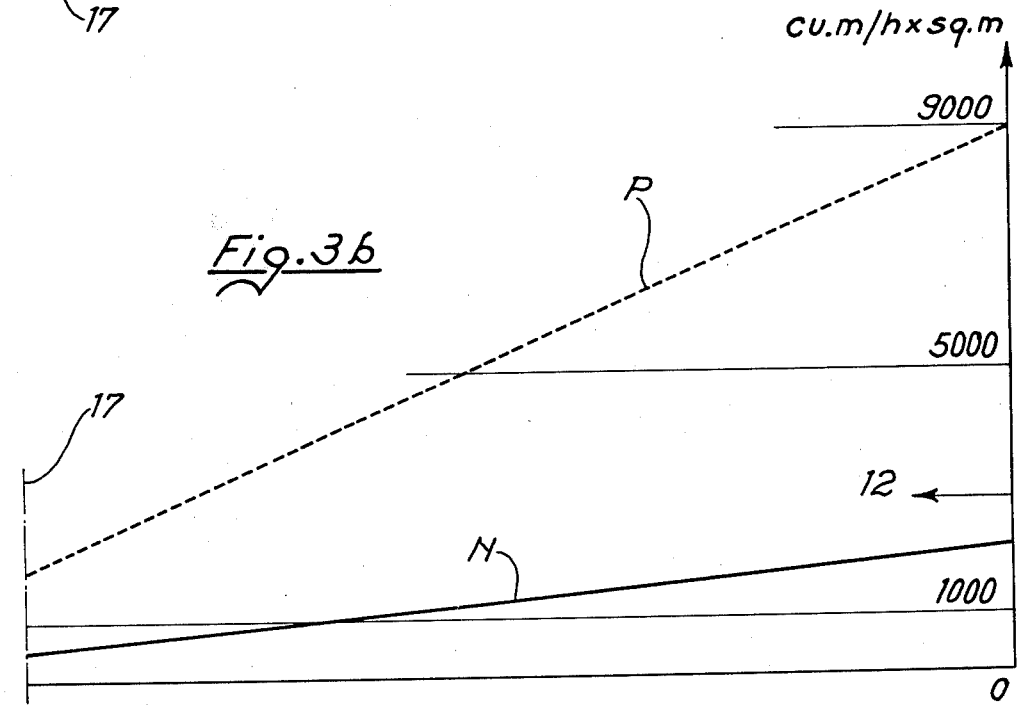

PROCESS AND APPARATUS FOR FIRING CERAMIC MATERIALS

CROSS-REFERENCES TO RELATED APPLICATION

This application is a continuation-in-part of my prior application Ser. No. 049,166, filed on June 18, 1979, now abandoned, and whose entire disclosure is incorporated herewith by reference.

This invention refers to process and apparatus for firing ceramic materials, particularly tiles for flooring or wall covering.

The invention generally pertains to a class of methods for the firing of ceramic materials, particularly tiles, wherein said materials are individually progressed by means of suitable rotatable supports, through a generally elongated heat treatment chamber.

The word "individually" is to be construed as meaning that the ceramic pieces are not loaded onto carts or other carriers each of which carriers a plurality of pieces (which carriers are introduced into a firing chamber and allowed to stand for the required length of time or are passed through said chamber) but, on the contrary, the pieces to be treated, travel through the heat treatment chamber individually; however, a considerable number of pieces will be within the chamber at any one time and although they are not connected to one another, still they all actually travel at the same speed, and theoretically in invariable positioned relationship, due to the action of the supports.

Many of such methods for the heat treatment of ceramic materials such as tiles, are known. The treatment chamber has the configuration of an elongated tunnel, usually though not necessarily rectangular in cross-section, and a number of supports generally rollers rotating about fixed axes, are provided in the chamber to support and advance the tiles therealong. In any case in the class of treatments to which this invention relates, both faces of each tile are essentially freely exposed to the trasmission of heat, independently of the means adopted, and even though one face—the lower one—is actually partially screened off due to the interference of the supporting means, efforts have been made to reduce such interference to a minimum so that the transmission of heat should be as nearly as possible the same on both faces. This is what is intended when it is said that the surfaces of the tiles are "essentially freely exposed to the transmission of heat".

The heat treatment of ceramic materials, especially tiles—hereinafter this specification will constantly refer to tiles, though no disclaimer of the application of the invention to other ceramic materials is implied—presents considerable difficulties due to the need of concurrently satisfying various requirements. Therefore various processes are known. When tiles glazed on one face are to be produced, the body is fired first and then it is coated with glaze and the glaze is fired or, alternatively, an unfired tile body is coated with glaze and the whole tile is fired in one passage. The temperature diagram required in each case depends on the chosen treatment cycle as well as on the chemical composition of the tile, its physical properties, its dimensions, particularly its thickness, and so on, and consequently varies accordingly.

This invention relates to improvements in the heat treatment of ceramic bodies, particularly tiles, and is not limited to specific treatment cycles or to particular kinds of ceramic material.

It generally relates to apparatus and processes wherein, the ceramic bodies are conveyed through an elongated heat treatment chamber, both of the main faces of each of said bodies being essentially freely exposed to heat transmission, and the ceramic bodies and the walls of said chamber are concurrently heated by introducing into said chamber a heating fluid comprising the gaseous combustion products of a fuel, the temperature of the portions of said walls which are in view of said ceramic bodies not being higher at any point than the temperature of said heating fluid. The gaseous combustion products are produced in combustion zones as positioned with respect to said treatment chamber that the portion of said zones in which a flame is present are not in view of their ceramic bodies, whereby the amount of heat exchange by radiation between the walls of said chamber in view of said bodies and the said bodies is not substantial.

The expression "in view" of the bodies or tiles means that the walls or wall portions being considered are so disposed as to exchange heat with the tiles by radiation—practically, that their points may be connected through a straight line with the faces of at least some tiles or with points of said faces. Therefore the apparatus for carrying out the invention may comprise additional wall surfaces which do not conform to the conditions set forth, provided that their position be such that they cannot exchange heat by radiation with the bodies being fired. Such additional wall surfaces are irrelevant to the invention and will not be considered, so that whenever the word "wall" or "wall surfaces" will be used hereinafter, without further precision, they will refer solely to wall surfaces in view of the tiles.

In the apparatus and processes to which the invention refers, the temperature of the wall surfaces should be as nearly as possible close to that of the tile surfaces. Temperature differences however are tolerated, and generally exist, provided that they be not so large as to play a determining role in the process: usually the walls are hotter than the tiles, though the opposite could occur in some particular cases.

The ideal condition according to the invention is achieved, when the walls in view of the tiles are heated solely by contact with the same heating fluid which heats the tiles. Said fluid may be air, heated in any conventional manner, or it may, and more commonly does, consist of combustion gases originated by the burning of a liquid or gaseous fuel, which combustion gases contain a certain amount of excess air which has not taken part in the combustion.

In the following description particular reference will be made to the case that the heating fluid is a mixture of combustion gases produced by a hydrocarbon fuel and air which has not participated in the combustion. It is evident that such a heating fluid is in a state of temperature equilibrium with the walls whereas its temperature is higher than that of the tiles since the latter enter the heat treatment chamber at a relatively low temperature and must become heated within said chamber. Therefore the treatment cycle is regulated—as will become clearer hereinafter—in such a way that the temperature difference between the heating gas and the tiles, and therefore between the chamber walls and the tiles, will never be so high as to cause a substantial heat exchange by radiation.

The treatment cycle has the following characteristics: Firstly the heat treatment occurs successively in two zones which may be called "heating zone" and "firing zone" respectively. In the heating zone, the tile is gradually brought to the range of firing temperatures at which the material undergoes the final physico-chemical transformations well known to the experts, and in the firing zone it is maintained within said temperatures range.

In practice it is desirable, for the sake of efficiency and economy, that the tile temperature should not be constant but should keep increasing during the firing phase until it reaches a maximum in the vicinity of the end of the firing zone. It has been found that it is not necessary to maintain the whole body of the tile at the maximum firing temperature for an extended period of time and that it is practically sufficient that the temperature to which the tile body must be brought to cause the desired chemico-physical transformation of the ceramic material, should propagate through the interior of said body until the whole body reaches the desired temperature. It has been found that no advantage is achieved by maintaining the tile for an extended period of time under conditions such that the maximum firing temperature uniformly prevails throughout its body, but on the contrary, this is uneconomical. Of course in practice it is impossible or at least it is not convenient directly to measure the temperature of the tile in its core and in all treatment phases, so that recourse is made to indirect measures and the treatment cycle is defined approximately by means of variables which can be measured easily and which indirectly reflect the desired condition of the whole tile body.

In the heating zone, the temperature of the heating fluid rises rapidly to the vicinity of the temperature required in the firing zone, preferably according to an approximately linear temperature diagram or a diagram which is a succession of approximately linear segments having different slants (in this case the slant generally decreases as the heating proceeds). In the firing zone the temperature of the heating fluid increases, as has been mentioned, up to a maximum and then remains almost constant or decreases slightly at first and then more markedly towards the end of the zone. The length of the zone wherein the temperature does not increase, or remains almost constant, depends on many factors, among which the composition of the ceramic material, the tile thickness, the presence and the characteristics of the glaze and so on, and may therefore vary considerable from case to case. In some cases, especially when the tile is thin, the temperature may continue to rise slowly, almost to the end of the zone, and then remain nearly constant for a short period of time.

When thicker tiles are fired, the temperature may remain constant over almost the entire zone. Therefore it is obvious that the passage from the heating to the firing zone cannot be precisely defined in terms of the temperature diagram, and actually said diagram may extend without evident profile or slant variations from the heating zone through the major portions of the firing zone. However, as will appear more clearly hereinafter, all this has no influence on the definition and application of the invention, which, as has been mentioned, is not limited to specific treatment cycles. It is sufficient to note than in general the firing temperatures range may be considered as reached at temperatures from 900° C. to 950° C., and therefore the relative process variables will be defined with reference to the temperature of 900° C., this being sufficient for all practical purposes for the application of the invention.

The tile temperature curve of course is considerably lower than that of the heating fluid and obviously different points of the tiles would yield different curves as the temperature at the surface is much closer to that of the heating fluid and increases much more rapidly than in the tile core. However it is not necessary to determine such curves in order to carry out this invention and actually they are a consequence of the fluid temperature and other process variables which can be determined without direct testing of the tiles.

The heating fluid, as has been stated, preferably consists of combustion gases with the addition of air which has not taken part in the combustion and generally flows in countercurrent to the tiles.

It is to be noted that said flow actually is not uniform or rectilinear. The introduction of the combustion gases generally at right angles to the heat treatment chamber axis, the impact of said gases on those which already flow through said chamber, the desirable presence of baffles for bringing the gases into close contact with the tiles, and so on, force the gases to flow with a turbulent motion and not merely in a straight unidirectional course but in local eddies, spirals and rings.

The values mentioned hereinafter relative to the gas flow are therefore average values and consider only the axial component of the gas flow, viz. the average gas flow through the transverse cross-section of the treatment chamber and in the direction of the axis thereof.

Any transverse flow, viz. flow which is perpendicular to said axis, is irrelevant as far as this invention is concerned. Therefore the invention is not applicable to apparatus and processes in which the gas flow is wholly or mainly transversal and gas transfer between axially successive portions of the treatment chamber is not essential and predominant.

The type of apparatus and process to which the invention refers and is applicable, are illustrated in U.S. Pat. Nos. 4,009,993 and 4,183,885. In such patents essentially axial gas flow is disclosed. No importance is attached, however, to the rate of said flow and no data are furnished with regard thereto.

This is invariably the case in the art prior to the invention. It was believed that the firing process is influenced solely by the temperature diagram, and that once the desired temperature diagram has been established in the treatment chamber, nothing else is relevent. It will be apparent that the amount of gases which flow through the chamber in a longitudinal direction influences the temperature diagram, all other things being equal, but is by no means the only factor or even the controlling one. Thus any desired temperature diagram may be obtained even in the total absence of longituinal gas flow; or, if such flow exists, its rate may be decreased by raising the gas temperature or lowering heat dispersions, or both, and viceversa. Because of the variety of factors involved, the prior art merely indicates the desired temperature diagram and leaves it to the skilled persons, who carry the firing processes into practice, to choose suitable means for producing said diagram, this being well within the purview of the skilled furnace designer.

The present invention is based on the surprising discovery that the gas flow rate per square meter of cross-section in the treatment chamber is a critical factor for successfully effecting high speed firing of articles, particularly tiles, of ceramic materials, particularly clay materials (e.g. as described and defined in aforementioned U.S. Pat. No. 4,183,885). Low speed firing, of course, is easier and is not subject to the same critical requirements. It is to be noted that high speed firing—which, in the case of tiles, means firing at a linear speed of the tiles through the furnace exceeding 1 mt/min—is a relatively recent development, which fact may in part explain the failure of the art to appreciate the criticality of the specific gas flow rates.

Be as it may, it is a fact that the art not only does not teach or suggest the critical gas flow rates to be specified hereinafter, but does not even teach or suggest that the gas flow rate may be a critical or even a significant factor at all. Notwithstanding this, the means for obtaining the flow rates defined by the invention are readily available in industry. Some indications in respect to them will be offered hereinafter for illustrative purposes, but even in the absence of such indications, persons skilled in the art would have no difficulty in carrying the invention into practice, except those normal design difficulties which inevitably attend the design of any furnace, even if conventional.

According to the invention, now, the heating fluid is gradually introduced into the heat treatment chamber so that its normal volume flow rate (volume which flows through a cross-section of the chamber in a unit of time, referred to normal temperature (25°) and (atmospheric) pressure conditions viz. measured in normal cubic meters per hour (Ncu.m/h)) increases from the zone of the tile exit from the chamber to a point not far from the tile entrance. The expression "volume flow rate" will be abbreviated hereinafter as follows: "V.F.R.".

It is to be noted that while the temperature varies considerably along the treatment chamber, the pressure is nearly constant, and its variations, in the order of a few millimeters of water, can be neglected. Since the temperature measured in the chamber, which may also be called "chamber temperature", is nearly constant through said zone, the aforementioned possible variations do not generally exceed 20% and more frequently 10–15% of the maximum temperature, in terms of absolute temperatures, except near the tile outlet, as better explained hereinafter. The actual V.F.R. (volume which axially flows through a cross-section of the chamber in a unit of time, referred to its actual temperature and to atmospheric pressure—the pressure obtaining in the chamber being in the order of a few millimeters of water and therefore negligible in calculating volumes—viz. measured in mc/h) also increases in such a way as to approach linearity.

The situation in the heating zone is different and will be described later.

The nearly linear increase of the V.F.R.'s is of course an ideal or limit condition inasmuch as the gases generally are not introduced continuously along the heat treatment chamber but on the contrary are introduced at separate spaced points where heating fluid sources, generally burners, are located, so that the V.F.R. diagram is not a straight line or a succession of straight lines with different slopes or even a curve, but consists of a large number of steps arranged about the ideal line defined according to the invention; the number, size and spacing of the steps depending on the number of heating fluid sources, generally burners. It is however sufficient to employ an adequate number of such sources to minimize the departure of the real diagram from the ideal one and render it irrelevant, so that only the ideal diagram will be considered and discussed hereinafter.

The normal V.F.R. of the heating fluid increases along the chamber because the mass of flowing heating fluid increases, as the fluid is introduced by steps. The actual V.F.R. is also influenced by temperature changes, which however are relatively minor in the firing zone.

One way of quantitatively defining the flow of fluid consist in measuring the specific (normal or actual) V.F.R., viz. the (normal or actual) V.F.R. per unit of cross-section at or near the tile inlet into the firing zone where the fluid mass is at maximum for said zone and the temperature has not yet fallen too much below its maximum value.

Due to the aforementioned difficulty of pinpointing said inlet, all the measurements will refer to the cross-section wherein the chamber temperature is 900° C., and for the purpose of this specification said cross-section will be assumed to be the inlet into the firing zone. In carrying out the invention, the specific actual V.F.R. measured at said point varies between 4,500 and 12,000 cubic meters per hour per square meter of cross-section, and is preferably between 6,000 and 10,000 cu.m/h.sq.m. The chamber temperature in the firing zone generally does not exceed 1,200° C. and its maximum is often comprised between 1,000° and 1,100° C.

The combustion of the fuels used to produce the heating fluid must occur in the presence of substantial excess air, or at least the combustion gases must be diluted with air which has not taken part in the combustion. It has been found that the amount of excess air required for carrying out the invention with hydrocarbon fuels is not critical and varies from one fuel to another, and is preferably comprised between 0.6 and 2 approximately, when expressed as the ratio between the amount of air which has not taken part in the combustion and the theoretical amount required for it —viz.: $(V_a-V_t)/V_t$, wherein $V_a$ is the total amount of air actually employed and $V_t$ the theoretical amount required.

In theory it would be possible to introduce all the gases, including all the air, required for the heat treatment gradually along the heat treatment chamber. Actually it is desirable to supply a certain amount of air as cooling means for the tile before they reach the tile outlet opening. This lowers the temperature near said outlet. This accelerates the cooling of the tiles. The air thus blown in flows longitudinally in countercurrent to the tiles, except for a minor portion thereof which flows out through the tile outlet from the furnace.

The amount of air supplied in either of the said ways must be taken into account by modifying the values of V.F.R. and air excess set forth hereinbefore. Said amount, measured as normal volume, may usually be from 20% to 40% of the normal volume of the total gases flowing through the 900° C. cross-section. If it is taken into account, the specific actual V.F.R. the limits become about 5,600 to 20,000 and preferably 7,500 to 16,700 cu.m/h sq.m. and the total air excess may rise correspondingly. If no air is introduced through the tile outlet or after the firing zone, it is possible to increase the excess air supplied to the burners to achieve a like effect.

As has been explained, air is introduced after the firing zone possibly through the tile outlet, and of course through the burners or in their vicinity. Further, openings may be provided in the walls of the apparatus which defines the heat treatment chamber, which openings are normally closed by suitable covers but may be opened from time to time to look inside the chamber or for other purposes. If the apparatus is made of a plurality of elements, joints therebetween may produce minor gaps. Except for this, the chamber, according to the invention, is completely isolated from the atmosphere. It has been found that this is essential for a precise control of the heat treatment, apart from being useful in saving fuel. The whole chamber, as has been said, is kept at a very slightly superatmospheric pressure. The chamber of course has another opening: the tile inlet, from which air will enter; but as will appear hereinafter, such air does not take part in the heat treatment and is immediately withdrawn from the chamber, so that it merely creates a zone of disturbance which cannot be avoided but is minimized as far as necessary and possible.

The actual specific V.F.R. of the heating fluid corresponds to an average linear velocity. But since heat is supplied to the tiles by the heating fluid, it has been found that it is preferable to increase the linear speed of said fluid in some cross-section of the heating chamber, in the vicinity of the tiles, above its average value, and further, to generate an adequate degree of turbulence within the fluid to enhance heat transmission and convection and to prevent the formation of a layer of gas colder than the average in the vicinity of the tiles. Preferably the average axial linear speed of the heating gases in the cross-sections of the heating chamber wherein it is increased, is at least twice the average axial linear speed in the cross-section wherein it is not increased.

Ideally, now only should the speed of the fluid be as high as possible near the tiles: it should also be as low as possible near the walls which define the chamber, to minimize heat transmission therethrough and heat losses. The first factor however is the more important, and means are therefore preferably provided to generate turbulences in the heating fluid which will mix its various layers and increase its linear speed at least at some points in the vicinity of the tiles. Said means will be explained later.

In the process according to the invention, the mass of ceramic material to be treated is not considered as a passive element and indeed a perturbing element from the viewpoint of the thermal balance which must be preserved against such perturbation, as is normally the case, but on the contrary, it is a positive element, and the inflow of material to be treated is one of the variables of the process and influences the apparatus for carrying it out. It has been found that said inflow should be considered as critically bound to the heat dispersion surface of the heat treatment chamber, and that if the latter is defined through the inner perimeter of its cross-section (which if measured in meters is obviously equal to the inner surface of a portion of chamber one meter long) which may be assumed to be the same along all or most of the length of the chamber, as it usually is, the variable to be considered is the ratio of the rate of travel (longitudinally of the treatment chamber) of the ceramic material to be treated to the perimeter of the chamber, which ratio will be called "relative rate of travel" of the material.

The rate of travel of the ceramic material could be expressed in terms of weight but, since the material is generally tiles, it is more significant to express it in terms of surface area viz. in square meters of surface (by which is meant the surface of one of the two major faces of the tile) passing through the chamber per hour and per meter of perimeter, which will be called "relative surface rate of travel", and designated hereinafter by the abbreviation "R.S.R.T.".

The calculation for transforming area into weight is very simple once the thickness of the tile and the specific weight of the ceramic material are known. As could be foreseen, the R.S.R.T. of the tiles varies with the tile thickness but not as much as would be expected, viz. it is not inversely proportional to said thickness and therefore to the weight of material which passes through the chamber with the passage of a given surface area. Taking into consideration e.g. tile thicknesses between 4.5 and 10 mm., which range substantially encompasses the most common sizes, the R.S.R.T. of the tiles may generally range from 22 to 30 sq.m/h.m. for low thicknesses and from 16 to 22 for high thicknesses and a complete range of R.S.R.T.'s for various thicknesses may be represented by a diagram which will be illustrated later on.

The flow characteristics of the heating gases have been defined hereinbefore by reference to a transverse cross-section regarded as the tile inlet into the firing zone. This obviously conincides with an assumed tile outlet from the heating zone. In the latter the V.F.R. of the heating fluid is not as critical as in the firing zone and the temperature diagram may be more critical.

On the one hand the ceramic material may be more heat sensitive in the heating zone, as when treating unfired ceramic bodies which usually require a more gradual heating, to a greater or lesser extent depending on compositions and pretreatments. On the other hand temperature differences between heating fluid and ceramic materials may be more marked in the heating zone, viz. at the beginning of the heat treatment, and smaller amounts of heating gases may suffice for the heat transmission, unless the necessity arises to evacuate reaction gases, such as water vapour, carbon dioxide, and so on. Consequently once V.F.R. of the gases at the tile outlet cross-section of the heating zone has been defined, the V.F.R., in other zones depend on the amount of heat required to produce the desired temperature diagram. As a first approximation, it may generally be contemplated to continue to supply heat linearly along a half or somewhat more than a half of the length of the heating zone, but at a rate lower than that of the firing zone, say about 15-30% smaller; and then to continue heating at a still lower rate up to the perturbation zone due to the vicinity of the tile inlet into the heat treatment chamber, where the heating gases are drawn from the chamber together with a certain amount of air drawn from the atmosphere through said inlet, as will be better explained when describing an embodiment of the invention.

Those skilled in the art will know how to distribute the supply of heat in the heating zone according to the above criteria, in such a way as to raise the chamber temperature gradually and preferably as nearly as possible linearly from that prevailing in the aforesaid perturbation zone to that which is desired at the passage from the heating to the firing zone.

Generally speaking, the desired gas V.F.R. is obtained as follows.

Gas suction means, such as a fan are placed near the tile inlet to draw the gases from within the treatment chamber and discharge them into the atmosphere or into a suitable pipeline. The flow rate of said means will be known and usually controllable within certain limits.

A portion of said flow rate will be due to air drawn into the furnace, through the tile inlet opening. Said portion will vary depending on the features of the particular installation and will be estimated or determined empirically. The remaining flow rate will be called the "net exhaust flow rate" and abbreviated as "N.E.F.R.". The latter, calculated under "normal" conditions (25° C. and atmospheric pressure), viz. as normal N.E.F.R., will be equal to the sum of the normal V.F.R. at the 900° C. cross-section and the normal volume of the combustion gases produced by the burners which are located upstream of said cross-section, viz. in the heating zone of the furnace.

The normal V.F.R. is chosen by the designer within the critical limits of the invention. Some criteria which will guide the designer will be explained hereinafter. The volume of said combustion gases is calculated through thermal balance considerations. Once the designer has chosen the length and cross-sectional dimensions of the furnace heating zone, he will know its outer surface; and will calculate the heat dispersed through it, based on the heat transmission coefficient of the insulation adopted. The burners must furnish said dispersed heat, plus the heat required to heat the tiles from room temperature to 900° C. (which is a function of the R.S.R.T., the thickness of the tiles, thus specific weight and their specific heat). The particular fuel used and the percentage of excess air adopted will determine how much fuel must be burned in the furnace heating zone to supply the required heat and what volume of combustion gases will be produced in burning it.

Thus the required N.E.F.R. will have been determined and a suitable fan or other apparatus will be used to provide it.

The total heat provided by the burners in the furnace heating zone will be distributed along its length to provide the desired temperature diagram, by adopting a suitable number and size of burners and suitably psitioning them. This is a matter of conventional design and is not related to the invention.

The choice of the optimal normal V.F.R., within the limits of the invention, is influenced by the following considerations. First of all, a thermal balance of the zones of the furnace downstream of the 900° C. cross-section can be established by estimating (a) heat losses through the walls; (b) the amount of heat required or furnished by the tiles to be heated from 900° C. to the maximum temperature and cooled from the latter to the outlet temperature; and (c) the amount of heat absorbed by the air drawn in through the tile outlet opening or blown on to the tiles to cool them. Said calculation will determine the heat to be furnished by the burners downstream of the 900° C. cross-section. The volume of combustion gases produced in furnishing said heat, for a given fuel, will depend on the average air excess. The designer will then choose the average air excess which on the one hand will provide a specific actual V.F.R. within the range defined by the invention and on the other will permit optimal burner efficiency. Once the overall heat supply and gas volume produced in the zones downstream of the 900° C. cross-section have been determined the particular distribution of the burners to be adopted will depend, once again, on conventional temperature diagram considerations.

The overall length of the treatment zones depends on the speed of travel of the tiles through the heat treatment chamber, taking into account that a treatment cycle usually requires less than 30 minutes and may be completed even in substantially shorter times e.g. 15 minutes or thereabout.

The heat treatment process according to the invention is carried out by means of apparatus consisting of a combination of means adapted to establish the desired conditions and to carry out the desired operations, as will be better understood hereinafter, and such apparatus too is an object of this invention.

An embodiment of the invention will now be described for purposes of illustration only, with reference to the accompanying drawings, wherein:

FIG. 2 is a schematic view at a greater scale than FIG. 1, of the heating zone of the chamber of FIG. 1;

FIGS. 2a and 2b are views of temperature and V.F.R. diagrams in said heating zone;

FIGS. 3, 3a and 3b are analogous to FIGS. 2, 2a and 2b, respectively, but refer to the firing zone of the chamber of FIG. 1;

The embodiment described refers to the heat treatment of an unfired ceramic tile body, but this is not a limitation as the invention is applicable to heat treatment in the manufacture of tiles or of ceramic bodies in general, as already stated. Likewise all the quantitative data do not constitute a limitation of the invention.

Figure 1:
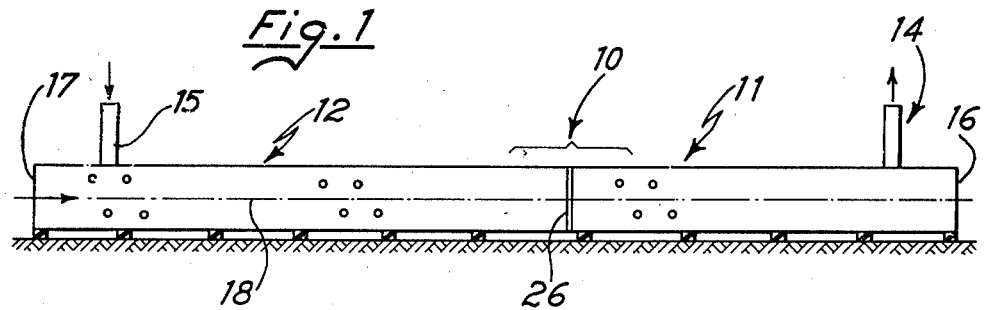
FIG. 1 is a schematic view of heat treatment chamber.

With reference to FIG. 1, the heat treatment chamber is generally indicated at 10 and is divided (from right to left in the drawing) in a heating zone 11 and a firing zone 12. This will usually be followed by a cooling zone or a plurality of such zones but these are not described as they are not part of the invention.

The division into zones as shown, of course, is only schematic, not only because, as already stated, the passage from one zone to another cannot be precisely identified, but also because the structure of the apparatus which defines the treatment chamber may comprise different sections, dimensioned and interconnected according to structural criteria which are not a part of the present invention.

E.g., the aforesaid heating and firing zones could be divided each into several elements, but this concerns the construction, and as concerns the invention, the two zones may be illustrated and are schematically illustrated as of one piece.

The tiles are assumed to enter the heating zone 11 in a dried state and at a temperature somewhat higher than room temperature—say, e.g., between 100° C. and 200° C.—as a result of the drying process. The drying means are not part of the invention and are not illustrated.

Reference numeral 14 indicates means for drawing the heating gases from chamber 10, which means may comprise a fan (non illustrated), generally a conventional suction fan with a single rotor, an exhaust chimney, and the like. Means such as valves may be provided to control the flow through the chimney, or the fan may be of a variable delivery type, though this is generally not required. As a consequence of the suction created at 14 the gases will flow in countercurrent to the tiles throughout the length of chamber 10, and therefore there may be an influx of air through the tile outlet opening 17. Preferably however cooling air will be blown over the hot tiles at a suitable position not far from outlet 17, by means of an air blower or fan 15 of a conventional type. The air thus blown in will be heated by the tiles and flow along the furnace in countercurrent to the tiles all the way to the fan 14, while a minor, uncontrolled portion thereof will flow out through outlet 17. While the ceramic bodies being treated are called "tiles", as the embodiment described particularly refers to tile bodies destined to be later coated with glaze and treated once more to fire the glaze, as far as the invention is concerned, nothing would change if they were complete tiles already coated with glaze, only simple adaptations being required. The word "tile" is therefore used as a matter of convenience to encompass all cases, in a quite generic way.

Reference numeral 16 indicates the tile inlet into chamber 10. Said chamber is isolated from the atmosphere between 16 and 17, except for the burners supplying heating gases. The air which will inevitably enter through opening 16, due to suction at 14, may be considered as a perturbing factor the effects of which are minimized by promptly evacuating it at 14.

Dash-and-dot line 18 indicates the level at which the tiles are progressed. Since they are thin bodies, said line may be taken as the level of the lower surface or of the horizontal center line of the tiles, and approximately coincides with the center line of chamber 10.

Figure 4:
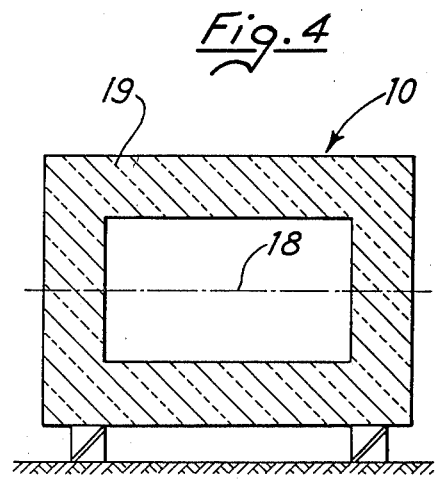
FIG. 4 is a schematic cross-section of the chamber of FIG. 1.

Chamber 10 is schematically illustrated in cross-section in FIG. 4. It has the customary rectangular sectional shape and is provided with insulation schematically indicated at 19, said insulation being omitted from all other figures as it is an essential but a conventional element.

Figure 1A:
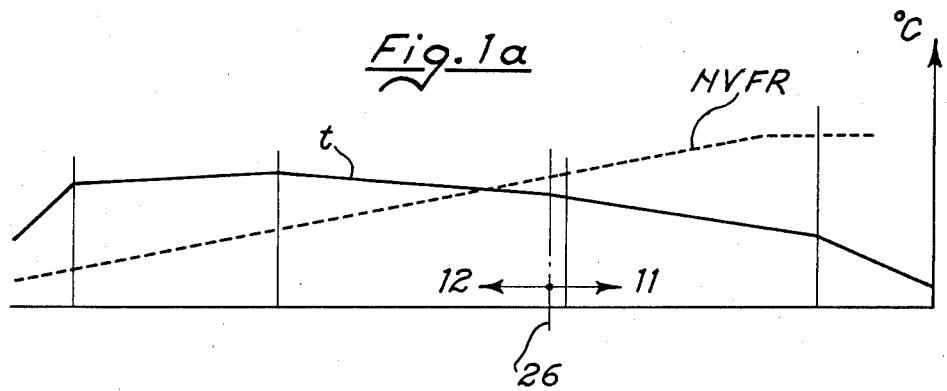
FIG. 1a is an example of a temperature and a normal V.F.R. diagram in the chamber of FIG. 1.

FIG. 1a illustrates the diagram of the temperature "t" of the heating fluid, approximately illustrated (in this and in the following figures) as a succession of straight segments, whereas of course it will actually be a curved line. Starting from tile inlet 16, it is seen that the temperature rises relatively sharply at the beginning and then more gradually to reach a maximum in the firing zone and to fall towards the end of the latter. A sharp drop is noted at the point where the cooling air is blown in through blower 15.

Of course, this is only one schematic example of the many possible temperature diagrams. In particular, as already mentioned, the length of the portion of zone 12 wherein the temperature is nearly constant, may be larger or smaller than shown.

The broken line in FIG. 1a illustrates the diagram of the normal volume flow rate of the heating gases, indicated as "N.V.F.R.", said gases flowing in countercurrent to the tiles, from 17 towards 16.

FIG. 2 illustrates the heating zone on a larger scale.

The tiles enter zone 11 at 16 and air is drawn into the chamber by the suction created by the chimney and possible fan means 14. This creates a perturbation zone, as has been already noted. In this perturbation zone which extends somewhat beyond (in the drawing, to the left) the position of means 14, no heat is supplied to chamber 10. The hot gases drawn out at 14 may be used to heat other apparatus so as to recover their heat, but this is not a part of this invention. In spite of the inflow of cold atmospheric air the temperature may rise relatively quickly, as illustrated in FIG. 2a, due to the hot gases mixing the incoming air. The gas and air suction and evacuation means, the outlet ports through which the suction occurs and all the constructive details of the perturbation zone, are a matter of design and not essential for this invention, and therefore they are not illustrated.

The supply of heating fluid—generally combustion gas produced by the burners—to the chamber 10 begins beyond point 14 and initially at a low rate since the temperature of the tiles is still low and heat exchange relatively easy, and the initial heating must be contained if the desired gradual and preferably ideally linear temperature increase is to be obtained. After a brief space, the heat supply is intensified. If heat is supplied by means of burners and these are all of the same power in the heating zone, they will be more spaced out in the vicinity of the perturbation zone and will be placed closer together as the heating is increased, so that at the end heating zone, the rate of heating will approximate that obtaining in the firing zone. It is easily understood that many variations are possible in the means of supplying the heat and graduating the rate of its supply.

In the embodiment illustrated, a number of inlets 21 of hot inlet gases, specifically, in this case, burner nozzles, are provided. The flame produced by said burners must not be in a part in view of the tiles, otherwise there would be a substantial heat transmission by radiation. The burners are therefore sunk far enough into the walls of the heating chamber, in suitable housing of any suitable cross-section, extending far enough laterally of the inner wall surfaces of the heat treatment chamber 10. This arrangement is conveniently the same in all zones of the chamber. In the embodiment illustrated the burners are staggered above and below the level 18 of the tiles: this is also preferred arrangement.

Reference numeral 23 indicates baffle plates which are provided to create eddies in the heating gases, to increase their linear speed in the vicinity of the tiles, and to assure thorough mixing thereof to prevent the formation of colder layers near the tiles.

FIG. 2a illustrates a possible diagram of the temperature "t" in degrees centigrade, of the gases in the heating zone. At tile inlet 16 the temperature is low and is related to the temperature at which the tiles enter the initial perturbation zone of the heating zone. If the tiles have been dried in a conventional drier, the initial temperature will be comprised e.g. between 100° and 200° C. Subsequently the temperature rises about linearly until a point slightly past cross-section 20 is reached, at which cross-section the supply of heating gases to the treatment chamber begins at a reduced rate, to reach its full rate for this zone at cross-section 25. From that point on it increases still linearly but less sharply to the end of the zone. The actual diagram of course will be a curve approximating the succession of two straight segments shown in the drawing, or an interrupted line comprising more than two segments.

The supply of heating gases has a lower rate at its beginning than in the rest of the heating chamber, as schematically indicated in the drawing which shows a first burner 21' below plane 18 and does not comprise in said zone, another burner above said plane: this of course is merely a schematic illustration and the actual arrangement for graduating the supply of heat may be quite different.

FIG. 2b illustrates the volume flow rate of the heating gases. Curve N in full lines represents the normal V.F.R. and curve P in broken lines the actual V.F.R. Both curves are drawn starting from point 14, viz. the end of the perturbation zone. Curve N is level from point 14 to cross-section 20, begins to slope linearly downwards from 20 to 25 and accentuates its downward slope from 25 to the end 26 of the zone.

FIG. 3 illustrates the firing zone in the same way as FIG. 2 illustrates the heating zone, on the basis of the diagram shown in FIG. 1a. The same reference numerals are used whenever possible. It is seen that the temperature rises slowly to a maximum in a central part of the zone and then decreases slowly, the maximum variation being less than 20% in the embodiment described. At 15, before the tile outlet 17, however, the temperature dips sharply as a consequence of the cooling air blown into the tiles.

FIG. 3b illustrates the V.F.R. diagrams in the firing zone and the same reference numerals are used as in FIG. 2b. Both the normal and the actual V.F.R. diagrams in this zone are ideally straight lines (in practice as has been noted before, they are a succession of steps).

Temperature and V.F.R. scales have been marked on FIG. 2a, 2b, 3a, and 3b. They are of course merely illustrative. The V.F.R. values refer to a cross-section of the treatment chamber of 1 square meter: viz., they are specific V.F.R. The following values may be cited by way of example. The specific actual space velocity at the passage 26 from the heating to the firing zone is about 9000 cu.m/h. The amount of air drawn into the chamber from the tile outlet is about 400 Ncu.m/h. The chamber temperature at that point is about 900° C. and the maximum chamber temperature is between 1000° C. and 1100° C. The heating zone, not counting the perturbation zone, was about 10 meters long and the firing zone about 19 meters. The treatment requires from 16 to 23 minutes, depending on the thickness and type of the tiles. Working according to this embodiment, the relative surface space velocity of the tiles varied from 26 to approximately 19 sq.m/h.m. as their thickness varied from 4.5 to 10 mm. These and other approximate values which could be read from the diagrams, are merely the illustration of what occurred in one example of a process according to the invention.

Figure 5:
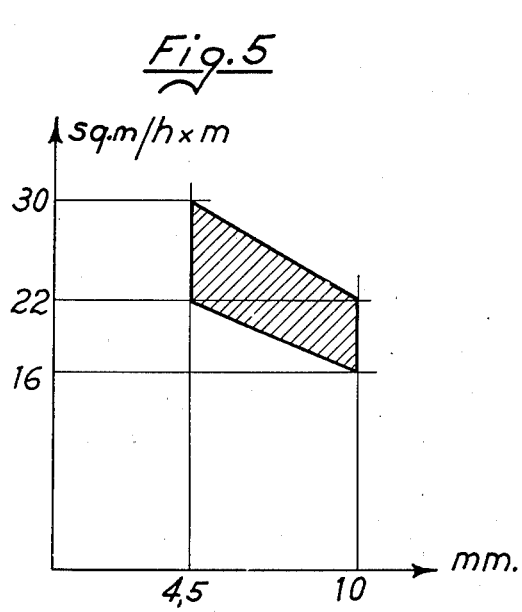
FIG. 5 shows a relative tile R.S.R.T. diagram.

FIG. 5 illustrates the relative surface rate of travel (R.S.R.T.) of the tiles according to the invention. Tile thicknesses, measured in millimeters, are the abscissae and relative surface space velocities the ordinates. The borderline values of the thickness are 4.5 and 10 mm. All the shaded area within the resulting quadrangle includes preferred R.S.R.T. values according to the invention. It will be understood that lower values will indicate inefficient operation, whereas higher values would be desirable whenever the nature of the ceramic material should make them possible.

EXAMPLE

A specific embodiment of the invention will now be described by way of further illustration.

A furnace was used having an inner width of 810 cm and an inner height of 1460 cm, viz. a cross-section of 1.18 sq.m. A fan 14 was used operating at a delivery rate of about 4000 Nmc/h (normal mc=mc at 25° and atmospheric pressure). The temperature of the gases at the exhaust was 400° C. The blower 15 had a delivery rate of 1200 Ncm/h and used ambient air at 25° C. In the heating zone of the furnace, up to the 900° C. cross-section, 35 Ncm/h of $CH_4$ gas were burnt with 800 Ncm/h of air, 32 burners of a conventional type were used, 16 for each side of the furnace, and 20 were positioned below the plane of the tile conveyor and 12 thereabove. The burners were conveniently staggered and their main distance mutual distance was about 1005 mm.

The maximum firing temperature was 1100° C. Between the 900° C. and the 1100° C. cross-sections, 96 burners were used, 48 for each side, equally divided above and below the tile conveyor. They burnt 105 Nmc/h of $CH_4$ with 1800 Nmc/h of air.

The total flow rate of gases at the 900° C. cross-section was 3105 Nmc/h, equal to 13,541 Nmc/h at 900° C. The specific actual V.F.R. was therefore about 11,475 mc/h×sq.m.

The tiles fired were 9 mm thick. Their rate of travel was 88 sq.m/h (about 1584 kg/h).

Since the perimeter of the chamber was 4620 mm, their R.S.R.T. was about 19 sq.m/h.m.

The linear speed of the tile travel was 1.5 mt/min.

I claim:

1. A process for firing bodies of ceramic materials such as tiles for flooring or wall covering, wherein said tiles have two opposed main planar surfaces, comprising the steps of conveying the ceramic bodies through an elongated heat treatment chamber having a tile inlet end and a tile outlet end so that both of the main surfaces of the ceramic bodies are freely exposed in heat exchange relationship with the atmosphere of said chamber including radiant heat from the chamber walls as the tiles move from the inlet end to the outlet end of said chamber, drawing gases from within the chamber at a location in the region of the tile inlet end of the chamber and discharging the drawn gases, simultaneously heating the ceramic bodies and the inner walls of said chamber by psssing a heating fluid including fuel combustion gases from a number of sources spaced longitudinally of said chamber so that the heating fluid flows in a direction generally opposite to the movement of the ceramic bodies, adjusting the temperature of the heating fluid so that the temperature at a transverse cross-section of the chamber intermediate the tile inlet and the tile outlet ends is at least 900° C., blocking the sources of the heating fluid from radiating heat into said chamber and arranging said sources so that portions of the chamber walls which are located to exchange heat with said bodies by radiation are heated to temperatures not higher than the temperature of said heating fluid, and controlling the actual volume flow rate of said heating fluid, as measured in the direction of the chamber axis and at the transverse cross-section of said chamber where the temperature is 900° C., within the range of from 4,500 to 12,000 cubic meter per square meter of transverse cross-section per hour.

2. Process for firing ceramic materials bodies, particularly tiles, comprising the steps of conveying the ceramic bodies through an elongated heat treatment chamber having a tile inlet end and a tile outlet end, freely exposing the main faces of said ceramic bodies to heat transmission, drawing gases from within the chamber at a location in the region of the tile inlet end of the chamber and discharging the drawn gases, simultaneously heating said ceramic bodies and the inner walls of said chamber by introducing into said chamber a heating fluid comprising the combustion gases of a fuel, adjusting the temperature of the heating fluid so that the temperature at a transverse cross-section of the chamber intermediate the tile inlet and the tile outlet ends is at least 900° C., maintaining the portions of said inner walls which are in view of said bodies at temperatures not higher at any point than the temperature of said heating fluid, and controlling the actual volume flow rate of the heating fluid including excess air, measured in the direction of the heat treatment chamber axis and at its cross-section wherein the chamber temperature is 900° C., within the range of between 6000 and 10,000 cu.m. per sq.m. of transverse cross-section.

3. Process according to claim 2, including introducing the heating fluid laterally and at points spaced longitudinally from one another in the heat treatment chamber; and increasing the normal volume flow rate of the heating fluid from the region of the outlet end of the chamber to the vicinity of the inlet end of said chamber.

4. Process according to claim 2, including defining a heating zone and a firing zone along the longitudinal direction of the treatment chamber wherein said zones adjoin each other at the 900° C. cross-section of the chamber, introducing the heating fluid so that it flows along said chamber in countercurrent to the movement of the ceramic bodies, and controlling the normal volume flow rate of the heating fluid so that it increases essentially linearly in the direction of its flow through a major portion of said chamber including at least the firing zone.

5. Process according to claim 1, including controlling the rate of travel of the tiles through the heat treatment chamber within the range of between 22 and 30 sq.m. of tile surface per hour and per linear meter of inner perimeter of the heat treatment chamber, for tiles having a thickness of about 4.5 mm.

6. Process according to claim 1, including controlling the actual volume flow rate of said heating fluid within the range of between 6000 and 10,000 cu.m./h per sq.m. of transverse cross-section.

7. Process according to claim 1, including blowing cooling air onto the tiles within the heat treatment chamber at a location in the region of the tile outlet end of the chamber.

8. Process according to claim 1, including producing, at a certain number of transverse cross-sections of the heat treatment chamber and in the vicinity of the ceramic bodies, local turbulences and linear speed increases of the heating fluid.

9. Process according to claim 1, including providing tiles as the ceramic bodies.

10. Tiles fired by the process according to claim 1.

11. Process according to claim 1, including controlling the rate of travel of the tiles through the heat treatment chamber between certain limits the values of which decrease linearly from a first minimum of 22 and a first maximum of 30 sq.m. of tile surface per hour per linear meter of inner perimeter of the heat treatment chamber for tiles having a thickness of about 4.5 mm., to a second minimum of 16 and a second maximum of 22 sq.m. of tile surface per hour and per linear meter of inner perimeter of the heat treatment chamber for tiles having a thickness of about 10 mm.

* * * * *